(12) United States Patent
Kim

(10) Patent No.: US 6,858,281 B2
(45) Date of Patent: Feb. 22, 2005

(54) WATER RETAINING GOLF TOWEL

(76) Inventor: Dongon Kim, 2960 W. 8st. Apt. #308, Los Angeles, CA (US) 90005

(*) Notice: Subject to any disclaimer, the term of this patent is extended or adjusted under 35 U.S.C. 154(b) by 75 days.

(21) Appl. No.: 10/386,468

(22) Filed: Mar. 12, 2003

(65) Prior Publication Data

US 2004/0255421 A1 Dec. 23, 2004

(51) Int. Cl.$^7$ ................................................ B32B 3/06
(52) U.S. Cl. ........................ 428/95; 428/102; 428/137; 15/118; 15/209.1
(58) Field of Search ............................. 428/99, 85, 92, 428/102, 137, 95; 15/118, 209.1, 244.3

(56) References Cited

U.S. PATENT DOCUMENTS 5,671,498 A * 9/1997 Martin et al. ............... 15/244.3

* cited by examiner

Primary Examiner—Alexander S. Thomas
(74) Attorney, Agent, or Firm—Eugene Oak

(57) ABSTRACT

A novel golf towel, retaining water over four hours under an average weather for golfing, is comprised of; 1) an outer layer of Terry cloth made of a composite texture of: including but not limited to, cotton, polyester and polyimide; 2) an inner layer of porous hydrophilic polymer; and 3) a grommet for a holding means. The outer layer of the Terry cloth and the inner layer of thr porous hydrophilic polymer are cut into a similar size and stitched together to prevent a separate moving. The structure and the compositon of materials of the textile for the outer layer cloth combined with the porous structure of the inner layer show excellent longer water retaining time while maintaining softness and cleaning power of an average towel. Amount of water remained in the towel of this invention and that of two 100% cotton towels measured at 30 minutes' time interval reveals a much slower evaporation of water from the towel of this invention. Even after four hours' exposure to sunlight and winds, the towel of this invention holds 10% of the water impregnated in the towel. A 100% cotton towel releases all the water after 90 minutes at the same condition.

2 Claims, 3 Drawing Sheets

WATER RETAINING GOLF TOWEL

This invention relates to a golf towel that retains water for a long time, i.e., four hours, which is an average time for one 18-hole rounding.

BACKGROUND OF THE INVENTION

In spite of many golf ball washing tools of the prior art, today's amateur golfers prefer to carry just a simple towel for washing golf balls during the game. However, an average cotton towel dries within two hours. Golfers need to get out of the course to wet their golf towels. It may break the rhythm of the golfing. It is the purpose of this invention to provide a towel retaining water more than four hours to let the golfers concentrate more on their play only.

FIELD OF THE INVENTION

This invention relates to a golf towel having an inner layer for containing water in its pore structure and an outer layer releasing the water to the air.

DESCRIPTION OF THE PRIOR ARTS

U.S. Pat. No. 2,530,746 and U.S. Pat. No. 2,968,825 to Wethebry illustrate a golf ball cleaner in a shape of a pocket comprised of a water absorbing inside layer, and a waterproof outer layer. Water remains in the pocket for a long time. To clean golf ball the player should open the mouth of the pocket and insert the ball into the pocket. User has to turn over the pocket to remove dirt remaining inside and has to do laundry and dry for the next play. U.S. Pat. No. 6,226,827 to English, Jr. illustrates a golf towel, having a first dry cleaning surface and a second moisturized cleaning element 22 in a pocket 18. The pocket 18 is partially open and a non-permeable polyethylene film blocks the water in moisturized element 22 from permeating to the first dry layer 12. Golf ball should be inserted into this pocket to be cleaned.

U.S. Pat. No. 5,408,718 to Sadovsky, U.S. Pat. No. 5,639,532 to Wells illustrates, and U.S. Pat. No. 5,671,498 to Martin et al. illustrate cleaning/scrubbing device with an inner layer of porous polymeric material with an outer layer of woven synthetics. These are basically cleaning solution absorbed scrubbers, drying of the absorbed solution was not being of any concern.

None of the prior art controls the drying of the towel as in this invention for a desired time period. Just wash and dry, like a normal towel, is enough to maintain the present invention clean and odor free.

SUMMARY OF THE INVENTION

A novel golf towel, retaining water over four hours under an average weather for golfing, is comprised of: 1) an outer layer of Terry cloth made of a composite texture of, including but not limited to, cotton, polyester and polyimide; 2) an inner layer of porous hydrophilic polymer; and 3) a grommet for a holding means. The outer layer of the Terry cloth and the inner layer of a porous hydrophilic polymer are cut into a similar size and stitched together to prevent a separate moving. Perimeter of the towel is concealed with the outer layer Terry cloth. The structure and composition of materials of the textile for outer layer cloth combined with the porous structure of the inner layer show excellent water retaining time while maintaining softness and cleaning power of an average towel. The amount of water remained on the towel of this invention and two 100% cotton towels are measured at 30 minutes time interval reveals a much slower evaporation of water from the towel of this invention. Even after four hours' exposure to sunlight and winds, the towel of this invention holds 10% of the water impregnated in the towel. Meanwhile, a 100% cotton towel releases all the water after 90 minutes at the same condition.

DETAILED DESCRIPTION OF THE PREFERRED EMBODIMENTS

Figure 1:
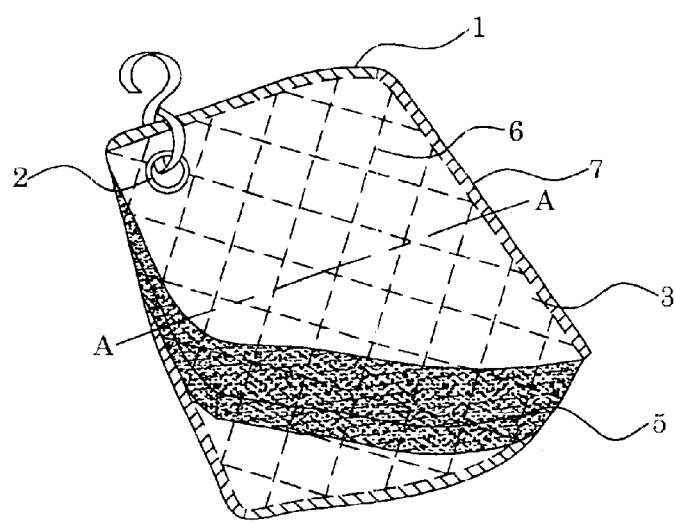
FIG. 1 is an exploded isomeric view of the golf towel of this invention.
Figure 2:
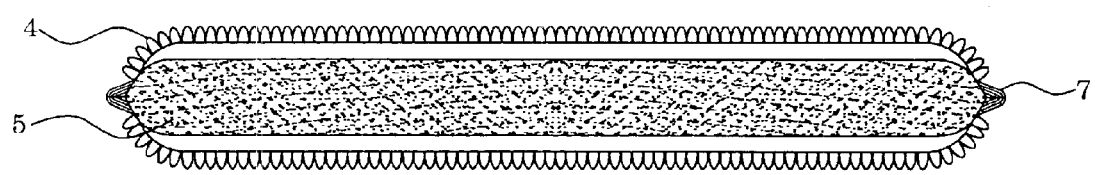
FIG. 2 is a cross sectional view of the towel along the line A—A.

FIG. 1 is an exploded isomeric view of the golf towel of this invention (1). The towel is shaped in long square looks like average cotton towel. A grommet (2) is developed at the corner of the towel (1) for hang the towel to the waist belt of a player. The outer layer (3) is made of Terry cloth made with filaments of cotton, polyester and polyimide. FIG. 2 is a cross sectional view of the towel along the line A—A. The top surface of the outer layer (3) is covered with short Terry (4) of 2 mm length and 1 mm thickness. The surface population density of the terry is 100 each/cm$^2$.

The inner layer is a porous sponge of apparent density in the range of 0.01 g/cc to 0.1 g/cc. Thickness of the inner layer (5) is in the range of 1 mm to 5 mm. The inner layer and the outer layer are stitched (6) to prevent a separate moving. Perimeter (7) of the upper outer layer and lower outer layer of the towel is sealed with a mechanical sewing.

Experiment

Drying velocity of the golf towel of this invention is compared with two kinds of 100% cotton towels with different thicknesses. Sample No. 1 and Sample No. 2 is 100% cotton towel of 3 mm thickness, 5 mm thickness, respectively. Sample No. 3 is a golf towel of this invention which has total a thickness of 7 mm. Samples are prepared with the same size of 9 inches by 17 inches. Weights of dried samples are measured and are wet with water for 30 minutes. Three samples are exposed to the same atmosphere and conditions of; 1) 14:00 hr to 18:00 hr strong sunlight with mild wind at 32° C., air humidity less than 30%; 2) 08:00 hr to 12:00 hr mild sun light, air humidity less than 30%, 27° C. Total weight of each samples are measured in 30 minutes' interval. The results are summarized in Table. 1. While samples 1 and 2 are dried within 3 hours irrespective of the temperature, the sample 3 contains water for more than four hours.

TABLE 1

Change of the Weight of the Water Soaked Towels

|  | Sample | Dry | Wetted | 0.5 hrs | 1 hrs | 1.5 hrs | 2 hrs | 2.5 hrs | 3 hrs | 3.5 hrs | 4.0 hrs |
|---|---|---|---|---|---|---|---|---|---|---|---|
| 1st Test* | No. 1 | 50 | 230 | 140 | 100 | 70 | 50 | 50 | 50 | 50 | 50 |
|  | No. 2 | 60 | 280 | 180 | 140 | 90 | 68 | 66 | 60 | 60 | 60 |
|  | No. 3 | 90 | 480 | 300 | 270 | 210 | 190 | 160 | 144 | 130 | 120 |
| 2nd Test** | No. 1 | 50 | 230 | 140 | 110 | 80 | 60 | 50 | 50 | 50 | 50 |
|  | No. 2 | 60 | 280 | 170 | 140 | 100 | 75 | 63 | 60 | 60 | 60 |
|  | No. 3 | 90 | 490 | 320 | 290 | 260 | 240 | 228 | 190 | 176 | 140 |

Sample No. 1; 100% cotton towel 3 mm thickness.
Sample No. 2; 100% cotton towel 5 mm thickness.
Sample No. 3; Golf towel of this invention.
*1st Test condition; Strong sun light, air humidity less than 30%, from 2 P.M. to 6 P.M.
**2nd Test Condition; Mild sun light, air humidity less than 30%, from 8 A.M. to 12 A.M.

Figure 3:
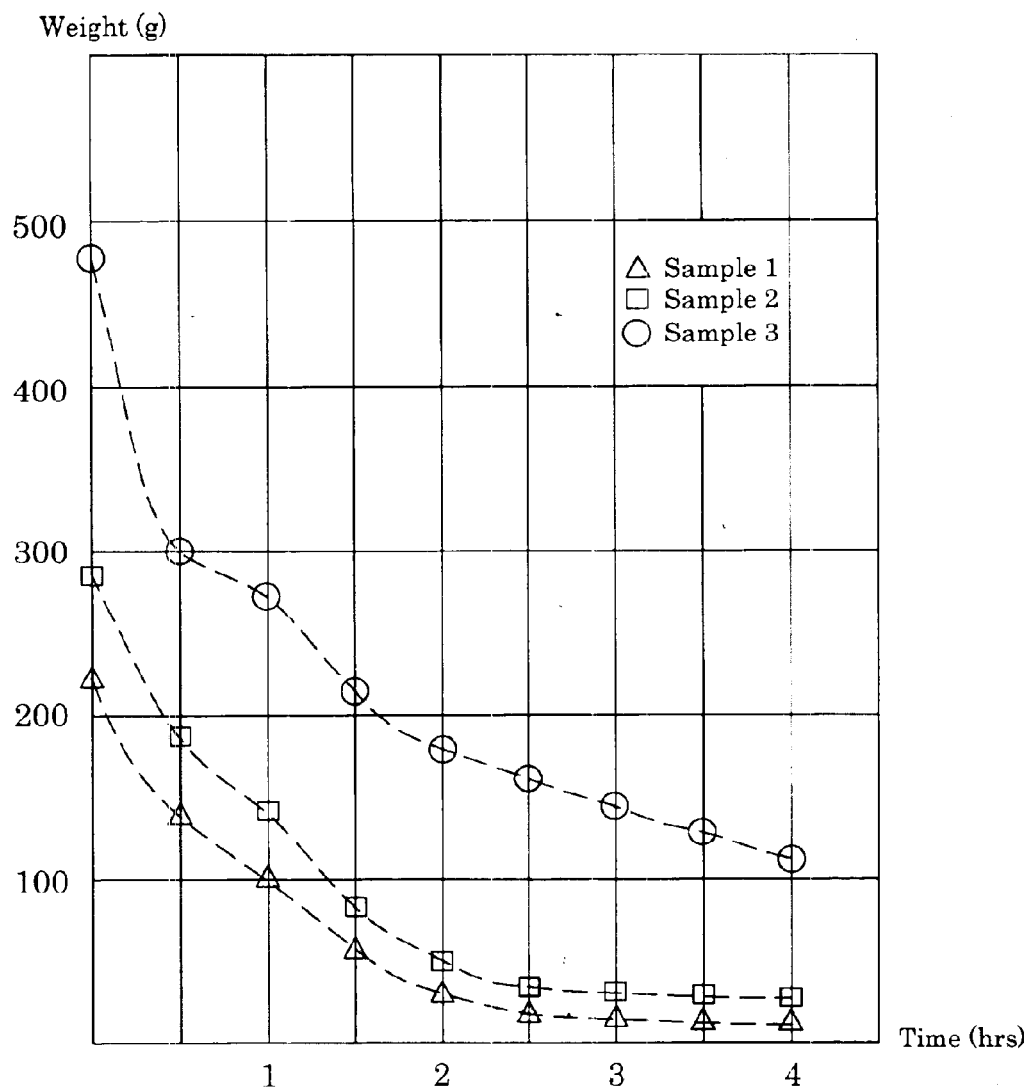
FIG. 3 is a graph showing the change of weight of towel plus water as time elapses.

FIG. 3 is a graph showing the change of weight of towel plus water as time elapses for the 1st test. Within two hours, the rate of weight decrease, in other words, the drying rates of the samples are similar. Sample No. 2, the thicker cotton towel, shows faster drying than the thinner one, Sample No. 1. After two hours, the two samples of 100% cotton towels returns to their dry state. However, the Sample No. 3, the golf towel still releases water even after four hours.

Figure 4:
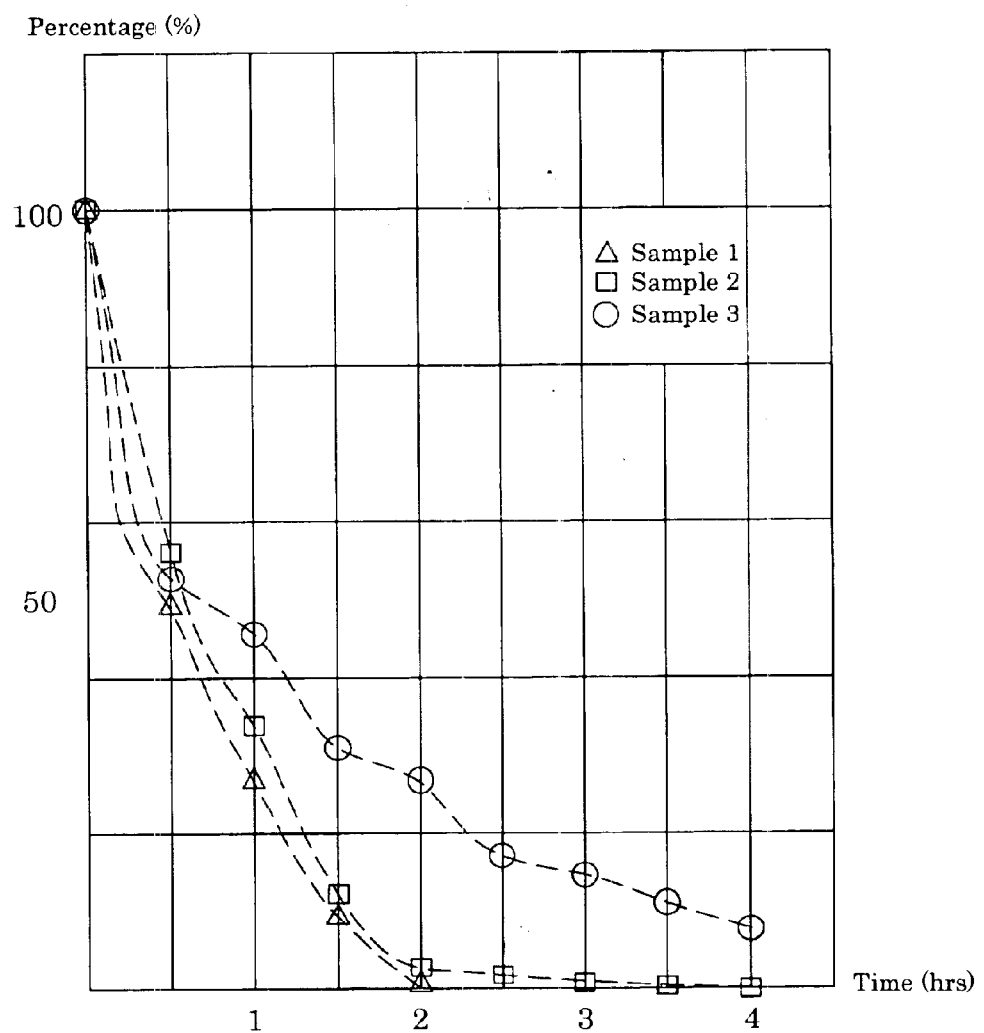
FIG. 4 is a graph showing the change of wt % of water remaining in the towel as time elapses.

FIG. 4 is a graph showing the change of wt % of water remaining in the towel as time elapses. As seen in FIG. 4, about 50% of the water impregnated in the samples evaporated in 30 minutes. The two samples of 100% cotton towels, Sample No. 1 and No. 2, loose about half of the water in every 30 minutes and reaches 0% after two hours. The Sample No. 3, the golf towel of this invention, looses the water very slowly. Even after 4 hours later, the golf towel retains about 10% of the original water.

As illustrated above, the water retaining time is adjusted by controlling; 1) the thickness and average pore diameter of the inner layer (5); 2) the composition of the materials of the outer layer (3); and the structure of the filament for textile of the outer layer (3).

The best mode of this invention is to use: 1) sponge of 3 mm thickness with an average pore diameter of 0.2 mm; 2) 75% cotton, 24% polyester and, 1% of polyimide comprised of the material of the outer layer (3); and thickness of the filament of polyester and polyimide composite is 30 micrometer. The height and thickness of the short Terry (4), on the outer layer (3) surface are, 2 mm and 1 mm, respectively.

What is claimed is:

1. A novel golf towel for retaining over 8% of the original water impregnated in the towel over four hours at environmental conditions of 25 to 32° C., air humidity less than 30% and under sunlight, which is comprised of; 1) an outer layer of terry cloth made of a composite texture of 75 wt % cotton, 24 wt %/o polyester and 1 wt % polyimide and having terry of 2 mm length and 1 mm thickness with surface population density of 100 each/1 cm$^2$; 2) an inner layer of porous hydrophilic polymer having a thickness 3 mm, apparent density 0.1 g/cc and an average pore diameter of 0.2 mm; and 3) a grommet for a holding means.

2. The novel golf towel of claim 1, wherein the outer layer of terry cloth and inner layer or porous hydrophilic polymer are cut into similar sizes and stitched together to prevent separate movings.

* * * * *